United States Patent [19]
Freeburg et al.

[11] Patent Number: 5,142,691
[45] Date of Patent: Aug. 25, 1992

[54] FREQUENCY MANAGEMENT SYSTEM

[75] Inventors: Thomas A. Freeburg, Arlington Heights; Susan M. Whitney, Barrington, both of Ill.

[73] Assignee: Motorola, Inc., Schaumburg, Ill.

[21] Appl. No.: 681,813

[22] Filed: Apr. 5, 1991

[51] Int. Cl.$^5$ .............................................. H04B 1/00
[52] U.S. Cl. .................................... 455/38.2; 455/63; 455/78; 455/58.2
[58] Field of Search ...................... 455/63, 34, 33, 53, 455/54, 57, 71, 56, 62, 38, 58, 78, 88; 379/63; 340/825.47, 825.48, 825.5, 825.06

[56] References Cited

U.S. PATENT DOCUMENTS 4,670,906 6/1987 Thro ...................................... 455/33
4,872,205 10/1989 Smith ...................................... 455/34

Primary Examiner—Curtis Kuntz
Assistant Examiner—Christine K. Belzer
Attorney, Agent, or Firm—Val Jean F. Hillman

[57] ABSTRACT

A wireless RF communication system that shares frequency assignment with existing RF systems scans a set of possible operating frequencies for signals transmitted by the other systems. This data is sent to a frequency management center where a safe operating frequency is assigned. The new RF system periodically scans the set of frequencies and will automatically inhibit transmissions if a signal from another system is detected which exceeds a threshold, thereby indicating that a possibility exists for interference.

12 Claims, 3 Drawing Sheets

FREQUENCY MANAGEMENT SYSTEM

BACKGROUND OF THE INVENTION

This invention is directed to a method and system which minimizes the possibility of interference between two or more wireless RF systems which share a predetermined group of frequencies. This invention is especially, but not exclusively, suited for applications where a second RF system is allowed to share frequencies previously assigned to a first RF system.

The efficient use of available RF spectrum becomes an increasingly important concern as additional communication demands increase. Most governments utilize a regulatory agency to control the allocation of RF spectrum to users. In the United States, AM, FM, and television stations are assigned frequencies by geographic regions to prevent substantial overlapping coverage. This permits frequencies to be reused in sufficiently separated regions.

The same strategy is utilized for commercial two way radio frequencies, that is, using geographic separation in order to achieve frequency reuse. In cellular telephone systems directive antennas are utilized to create relatively small geographic cells resulting in frequencies being available for reuse in smaller areas.

There exists a need to provide even greater spectral efficiencies by permitting a second communication service to utilize a range of frequencies previously assigned for the exclusive use of a first communication service. In order to avoid RF interference problems between the first and second services, the second assigned service may be required to minimize the possibility of interference to the first service.

DESCRIPTION OF A PREFERRED EMBODIMENT

Figure 1:
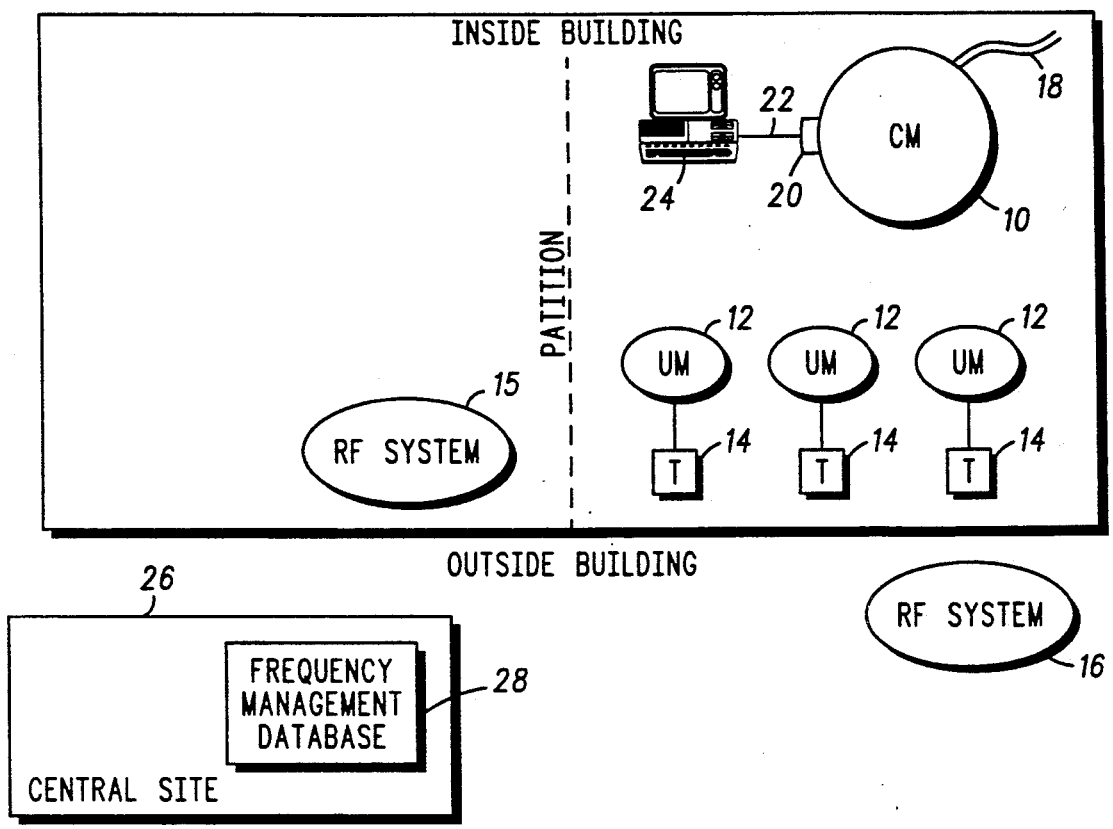
FIG. 1 illustrates a wireless communication system suited for incorporating the present invention.

FIG. 1 illustrates a wireless packet communication system in which a control module (CM) 10 functions as a master node and communicates using radio frequency signalling with user modules (UM) 12 which function as slaves to the CM. Each UM is connected to one or more terminals 14. A terminal may consist of a digital communication device such as a personal computer or other information input/output device, or a different communication device such as a telephone. The CM 10 is preferably connected to a network such as Ethernet by a communication channel 18 which may comprise coaxial cable or other means.

The terminals 14 communicate with each other and with other devices coupled to channel 18 by RF TDMA packets sent between each UM and the CM. Each UM has the same transmit (Tx) and receive (Rx) frequencies; the CM receives on the UM Tx frequency and transmits on the UM Rx frequency. The CM also has a port 20 which may comprise an RS232 port used for installation and maintenance purposes. This port is connected to a cable 22 which is connected to a control terminal 24 which may comprise a personal computer or other input/output devices.

The wireless inbuilding communication system is used in an environment or geographic location where it must share frequency channels with other RF systems. By sharing spectrum one major problem that arises is the possibility that other RF systems and the wireless inbuilding system may interfere with each other. Where the inbuilding system is the second or a later system to be put in operation, its interference with the existing or first RF system is the greater concern. In accordance with the present invention the CM is programmed not to transmit until a sequence of steps have been followed during installation.

Before the CM transmitter can become operational the CM must receive a "password" which may be based on its serial number from personnel at a frequency management control center. When the CM is initially installed it is connected to a control terminal 24. After the installation procedure is complete at its location of intended use, the CM is turned on. The CM receiver scans an allowed frequency table which is a list of potential allowable frequency channels that have been preprogrammed in its memory. As the CM completes its scan, it creates a "RF environment table" which preferably consists of values representing the RF signal levels detected for each scanned frequency. In this example, another inbuilding RF system 15 and an RF system 16 outside of the building exist which operates on frequencies that could be selected for use by the CM and UMs. The CM scans the possible frequencies and detects the presence of signals from the other systems.

This information is displayed to a person (installer) operating the control terminal 24 upon that person's request for the information. This may be accomplished by a key stroke that will cause the control terminal to print to a designated printer or display it on the screen. Once the desired information has been made available to the installer, the installer telephones the central frequency management site 26 and gives the information that was generated by the CM 10 to a person acting as a frequency management coordinator. The frequency management coordinator inputs this information into a frequency management database 28 along with other pertinent information such as the company name or owner of the new system, mailing address, the exact location of the CM which may comprise a floor in high rise building or other similar information, and the serial number of the CM.

The frequency management coordinator analyzes the results of a comparison of this data (especially the location) and other relevant data previously captured in the frequency management database to obtain a "safe" operating frequency. A safe frequency is one not being used or a frequency that is used by another system far enough away to avoid interference with the inbuilding system. A password which may be encrypted is given to the caller along with other pertinent information such as threshold levels which are used by the CM to ensure that the system is continually operating in a safe RF environment. The password includes a command that causes the CM to utilize the assigned operating frequency.

Once the installer receives and enters this information via the control terminal 24 into the CM, it selects the assigned operating frequency and becomes fully operational by unlocking its transmitter and allowing information to be transmitted. The UMs which are slaved to the CM also begin to transmit allowing the entire system to commence normal operation.

Figure 2:
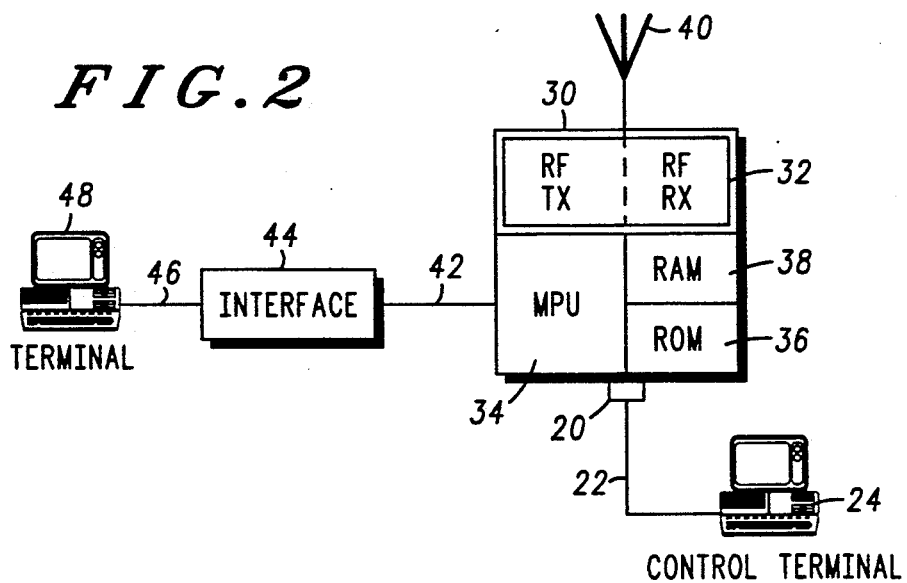
FIG. 2 is a block diagram illustrating an embodiment of control modules and user modules utilized in the packet system as shown in FIG. 1.

In FIG. 2 is a block diagram of a communication structure 30 common to both the CM and UMs. The communication structure 30 includes a transceiver device 32 and a microprocessor 34 with associated read only memory 36 and random access memory 38. The transceiver 32 includes one or more antennas 40 for RF communication. The communication structure is connected by wire 42 to an interface 44 which may comprise an analog to digital converter, a digital to analog converter or other devices that provide compatible signals between MPU 34 and terminal 48 connected by wire 46.

The communication structure 30 functions to both transmit and receive packets within the packet network. The RF transceiver 32 utilizes digital signals received from the terminal 48 to modulate an RF carrier to transmit the desired data. These digital signals are processed by the MPU 34 under the control of an operational program stored in ROM 36 and RAM 38 to convert digital data into a packet format. This packet is transmitted by the RF transmitter portion of the transceiver 32 as an RF signal over antenna 40 to another node in the packet network.

In the receiving mode, a packet signal is received by antenna 40 and demodulated by the RF receiver portion of the transceiver 32. The received digital packet information is processed by the MPU 34 in accordance with ROM 36 and RAM 38 to disassemble the packet information and send the recovered data to associated terminal 14 or channel 18. The port 20 provides local communication with a control terminal 24 linked by cable 22 for maintenance and control activities.

Figure 3:
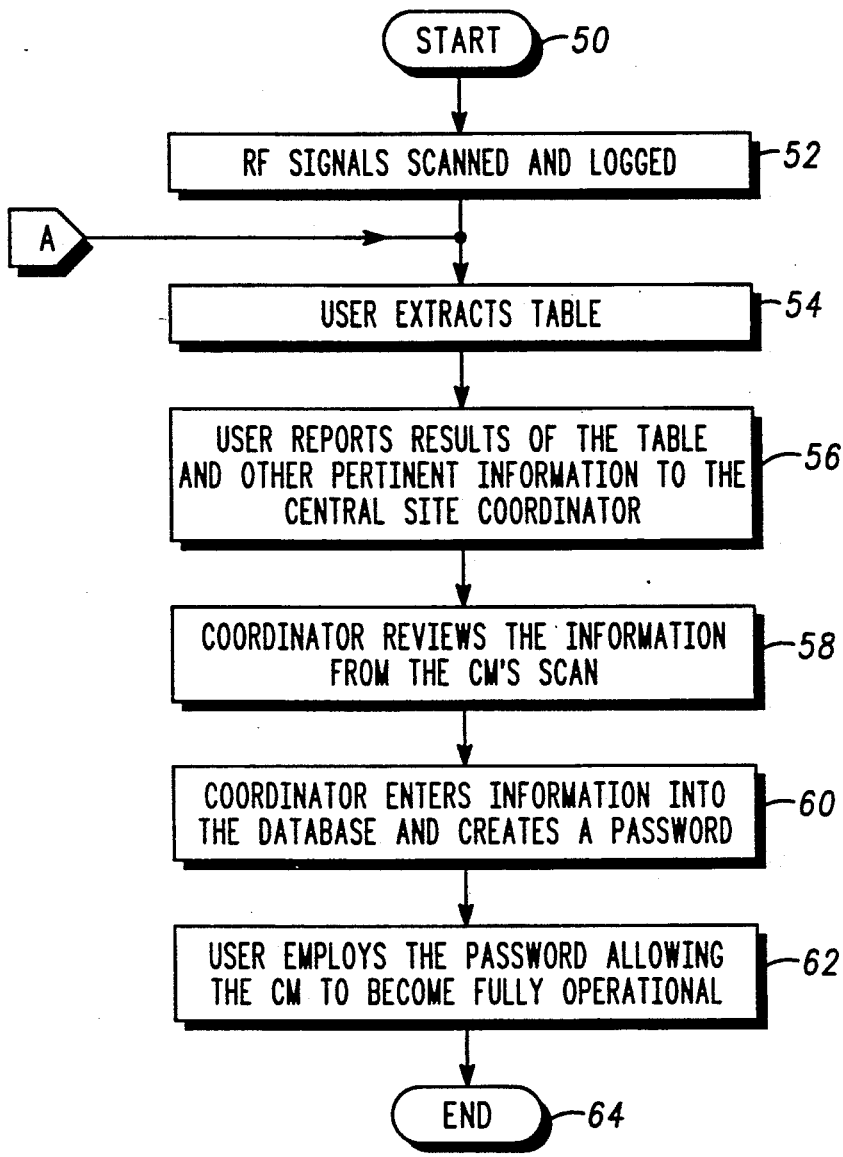
FIG. 3 is a flow diagram illustrating steps in accordance with the present invention for controlling the activity of a new wireless radio system in a geographic area where concurrent spectrum sharing is allowed.

FIG. 3 is a flow diagram illustrating an exemplary method for frequency management of a control module in accord with the present invention. Beginning with entry START 50 the CM is powered up for the first time. At initial power-up the CM is in a listen only mode with its transmitter locked OFF. In step 52 the CM scans for RF signals at each frequency in an allowed frequency table stored in its memory. The CM stores a value for each scanned frequency corresponding to the magnitude of detected RF signals, AM modulation level, and FM modulation level in an RF environment table that it creates. In step 54 the CM displays the RF environment table to the installer operating the control terminal 24 upon a request for the information. In step 56 the installer telephones the designated frequency management site and reports the CM's location, mailing address, serial number, and the stored table to a site coordinator. In step 58 the coordinator reviews the information from the CM's scan, enters the data, and compares it with the central site database which contains pertinent information (location, frequency assigned, etc.) about nearby RF systems that may potentially be interfered with by the wireless packet communication system. In step 60 the coordinator chooses a safe operating frequency based on a comparison of the CM data and the data in the frequency management database. A determination of the threshold levels to be used by the CM is made by the coordinator. These thresholds are used by the CM to determine when scanned signal values increase too much (beyond the threshold) to continue operation, i.e. the probability of interference becomes unacceptably high. The coordinator then constructs a password that will unlock the transmitter of the CM and a command that will cause the CM to select an operating frequency determined by the coordinator. The password, command and thresholds are communicated to the CM installer. In step 62 the installer enters this information allowing the CM to unlock its transmitter and become a fully operational system. As a result the UMs which are slaved to the CM also begin to transmit allowing the entire system to commence normal operation. In step 64 the installation procedure ENDs.

In this example, a CM installer and a coordinator at the frequency management center were involved in the exchange of information. The CM data could be transmitted directly to the site such as by a modem over the telephone line. An appropriate algorithm at the site database could compare the CM data with other relevant data in the database, make the CM frequency selection, and transmit the required data by modem back to the CM thereby minimizing if not eliminating the need for personnel.

Figure 4:
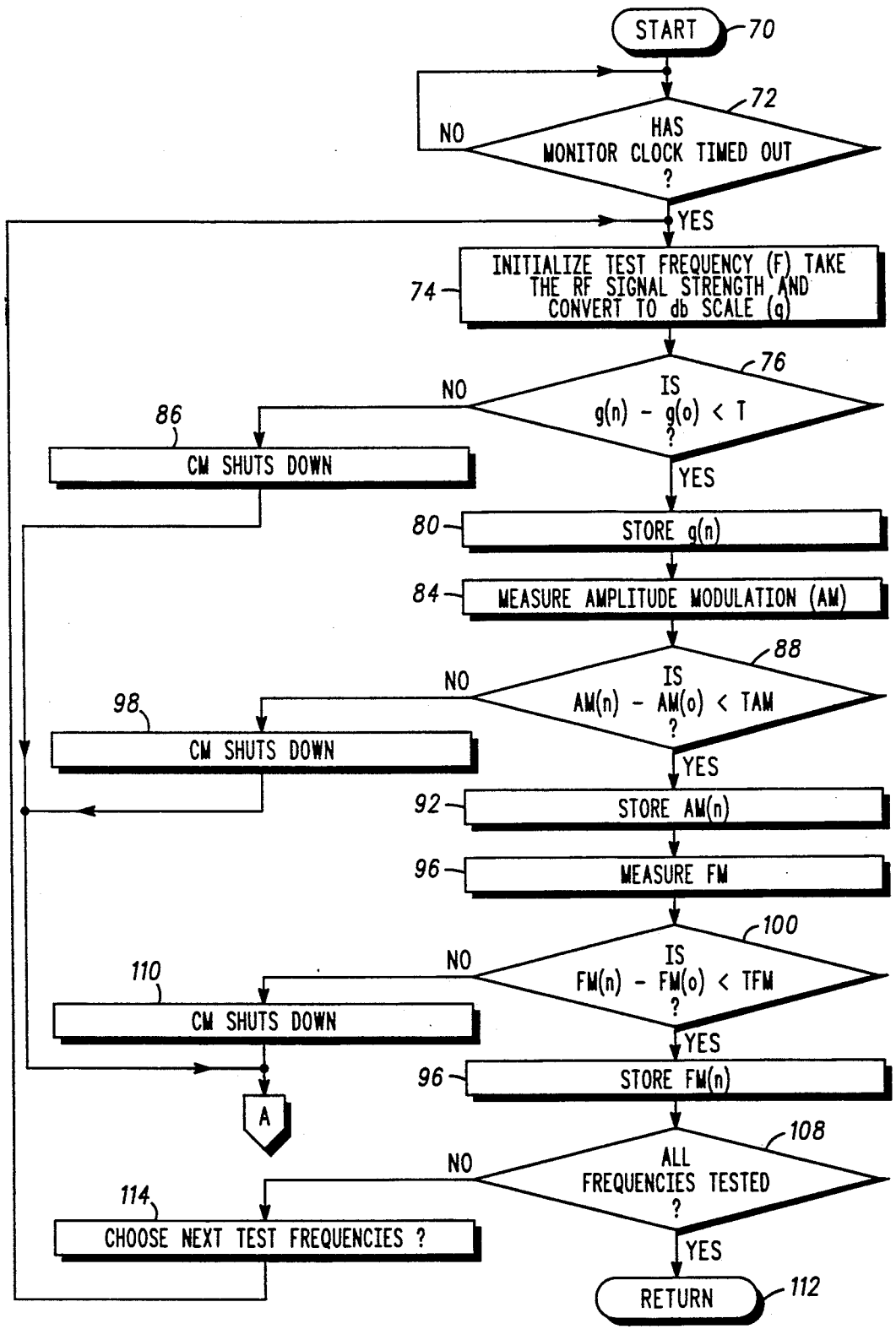
FIG. 4 is a flow diagram illustrating steps in accordance with the present invention for continuously monitoring shared spectrum to minimize the probability of interference in an RF environment that changes.

FIG. 4 is a flow diagram illustrating an exemplary method for a CM to continuously monitor shared frequency channels, by periodically detecting RF environmental changes beginning at START 70. How often the frequencies are monitored will be based on the nature of the RF environment, i.e. when significant changes in other RF systems occur, and the availability of time at the CM to execute the frequency scanning. The threshold values are preferably determined by the coordinator and transmitted to the CM but could be independently set at the CM. In step 72 the CM determines if the monitor clock has expired. A NO decision causes a return to START 70. A YES decision activates a sequence of threshold level checks. In step 74 the CM scans one of the frequencies in the table. As the CM scans a test frequency (F) it takes an RF signal strength reading, converts that reading to a decible (db) scale represented by the variable g and stores the value. In step 76 the CM determines if the mathematical result of the new RF level ($g_{(n)}$) minus old RF level ($g_{(o)}$) is less than a predetermined threshold (T). In step 76 a NO determination, which indicates that the system may not be operating at a safe frequency, results in step 86 causing the CM to shut down, i.e. locking its transmitter OFF. In step 76 a YES determination indicates no substantial signal from another RF system was detected. Step 80 causes the CM to update the table of RF signal information by storing g(n) in memory.

In step 84 the amplitude modulation (AM) level of a signal, if any, at the test frequency is measured and stored. In step 88 the CM determines if the mathematical result of the new AM level ($AM_{(n)}$) minus old AM level ($AM_{(o)}$) is less than a predetermined threshold ($T_{AM}$). A NO decision results in step 98 determining that enough of a change has occured in the RF environment and the CM transmitter is turned OFF. A YES determination by step 88 causes the AM level $AM_{(n)}$) to be stored; it is used as $AM_{(o)}$) the next time the same frequency is scanned.

In step 96 the frequency modulation (FM) level of a signal, if any, at the test frequency is measured and stored. In step 100 the CM determines if the mathematical result of the new FM level ($FM_{(n)}$) minus old FM level ($FM_{(o)}$) is less than a predetermined threshold ($T_{FM}$). A NO determination results in the CM concluding that enough of a change has occured in the RF environment and the CM transmitter is turned OFF to prevent a possible interference condition. A YES determination by step 100 causes the FM level $FM_{(n)}$) to be stored; it is used as $FM_{(o)}$) the next time the same frequency is scanned.

Following step 104, step 108 determines if all frequencies in the table have been scanned. If step 108 is YES, step 112 RETURNS the system to normal operation. If step 108 is NO, step 114 causes the CM to choose the next frequency in the table to be tested and returns control to step 74 which proceeds as explained above.

Following steps 86, 98, and 110 which cause the CM transmitter to be locked OFF, control passes back to step 54. Thus, the start-up procedure, requiring the transfer of data to the site coordinator and receipt of a password and other parameters, must be executed in order to unlock the CM transmitter. In the illustrative embodiment, the UM's which are slaves to the CM will also cease transmissions if signals are not received from the CM. Measuring RF signal strength, AM level, and FM levels are accomplished using known techniques by transceiver 32 and the MPU 34.

In the illustrative embodiment of the present invention, the ability of the CM to periodically determine changes in its surrounding RF environment and inhibit its transmitter are key aspects of successful management of shared frequency channels. The CM has the intelligence to scan the RF environment for systems utilizing the same frequency and automatically cease transmission if it determines that predetermined threshold levels have been exceeded, thereby preventing interference between the wireless inbuilding system and other RF systems.

Although an embodiment of the present invention has been shown and described, the scope of the invention is defined by the claims which follow.

We claim:

1. A method for minimizing radio frequency interference between a first set of wireless communications equipment operating in a range of frequencies and a second set of wireless communications equipment having a transmitter and receiver operating in said range of frequencies comprising the steps of:
   said transmitter of the second set of communications equipment being locked in an inoperative mode until it receives a predetermined password;
   said receiver of the second set of communications equipment scanning a predetermined set of frequencies within said range at its intended location of operation and storing a table of values corresponding to signals sensed during said scanning;
   communicating said table of values and said location to a frequency management control center having frequency usage and location data for said first and second sets of communication equipment;
   comparing said table of values and receiver location with said control center data;
   assigning a frequency of operation for said transmitter to minimize the possibility of interference based on said comparison;
   said control center generating said predetermined password and communicating it and said assigned frequency of operation to said transmitter;
   whereby said transmitter is unlocked and can begin transmissions.

2. The method according to claim 1 further comprising the steps of said receiver of the second set of communications equipment periodically scanning said set of frequencies and generating new values corresponding to previously stored values for each frequency.

3. The method according to claim 2 further comprising the steps of locking said transmitter in an inoperative mode if a new value compared to the corresponding previously stored value reaches a predetermined threshold indicative of a greater probability of interference, and storing said new values.

4. The method according to claim 3 further comprising the steps of communicating said table of values including said new values to said control center, comparing said table of values and receiver location with said control center data, assigning a frequency of operation for said transmitter to minimize the possibility of interference based on said comparison, said said control center generating said predetermined password and communicating it and said assigned frequency of operation to said transmitter thereby unlocking said transmitter.

5. A wireless communications system for minimizing radio frequency interference between a first set of wireless communications equipment operating in a range of frequencies and a second set of wireless communications equipment having a transmitter and receiver operating in said range of frequencies, the system comprising:
   means for locking said transmitter of the second set of communications equipment in an inoperative mode until it receives a predetermined password;
   said receiver of the second set of communications equipment including means for scanning a predetermined set of frequencies within said range at its intended location of operation and storing a table of values corresponding to signals sensed during said scanning;
   means for communicating said table of values and said location to a frequency management control center having frequency usage and location data for said first and second sets of communication equipment;
   means for comparing said table of values and receiver location with said control center data;
   means for assigning a frequency of operation for said transmitter to minimize the possibility of interference based on said comparison;
   said control center including means for generating said predetermined password and communicating it and said assigned frequency of operation to said transmitter, thereby unlocking said transmitter and permitting it to begin transmissions.

6. The system according to claim 5 further comprising said receiver of the second set of communications equipment including means for periodically scanning said set of frequencies and generating new values corresponding to previously stored values for each frequency.

7. The system according to claim 6 further comprising means for locking said transmitter in an inoperative mode if a new value compared to the corresponding previously stored value reaches a predetermined threshold indicative of a greater probability of interference, and means for storing said new values.

8. The system according to claim 7 further comprising said communicating means communicating said table of values including said new values to said control center, said comparing means comparing said table of values and receiver location with said control center data, said assigning means assigning a frequency of operation for said transmitter to minimize the possibility of interference based on the most recent comparison, said control center generating means generating said predetermined password and communicating it and said assigned frequency of operation to said transmitter thereby unlocking said transmitter.

9. A wireless radio frequency transceiver having a transmitter and receiver comprising:
   means for inhibiting said transmitter until a predetermined password is received;
   means for scanning a predetermined set of possible operating frequencies with said transceiver at its intended location of operation;
   means for storing a table of values corresponding to signals sensed at each scanned frequency;
   means for enabling said table of values and said location to be communicated to a frequency management control center having frequency usage and location data for a geographic area that includes the location of said transceiver;
   means for receiving said predetermined password generated by the control center and a command identifying a frequency of operation assigned by the control center;
   means for unlocking said transmitter and permitting it to begin transmissions upon receipt of said password and command.

10. The transceiver according to claim 9 wherein said scanning means periodically scans said set of frequencies and generating new values corresponding to previously stored values for each scanned frequency.

11. The transceiver according to claim 10 wherein said inhibiting means relocks said transmitter in an inoperative mode if a new value compared to the corresponding previously stored value reaches a predetermined threshold indicative of a greater probability of interference, said storing means also storing said new values.

12. The transceiver according to claim 11 wherein said enabling means enables said table of values including said new values to be communicated to the control center, said unlocking means unlocking said transmitter and permitting it to begin transmissions upon receipt of said password and command from the control center.

* * * * *